United States Patent
Yamahira et al.

(10) Patent No.: US 6,174,625 B1
(45) Date of Patent: Jan. 16, 2001

(54) ANODE MATERIAL, METHOD FOR PRODUCING IT AND NONAQUEOUS ELECTROLYTE CELL EMPLOYING SUCH ANODE MATERIALS

(75) Inventors: Takayuki Yamahira; Yoshiaki Takeuchi; Norio Mamada, all of Fukushima (JP)

(73) Assignee: Sony Corporation, Tokyo (JP)

( * ) Notice: Under 35 U.S.C. 154(b), the term of this patent shall be extended for 0 days.

(21) Appl. No.: 08/854,847

(22) Filed: Jun. 12, 1997

(30) Foreign Application Priority Data

May 17, 1996 (JP) ................................. 8-123437
Aug. 29, 1996 (JP) ................................. 8-228964

(51) Int. Cl.[7] ..................................... H01M 4/60
(52) U.S. Cl. ................................. 429/231.4; 429/231.8
(58) Field of Search .......................... 429/218, 231.4, 429/231.8

(56) References Cited

U.S. PATENT DOCUMENTS

| | | | |
|---|---|---|---|
| 5,028,500 | * 7/1991 | Fong et al. | 429/218 |
| 5,344,724 | * 9/1994 | Ozaki et al. | 429/94 |
| 5,451,477 | * 9/1995 | Omaru et al. | 429/218 |
| 5,571,638 | * 11/1996 | Satoh et al. | 429/248 |
| 5,622,793 | * 4/1997 | Iijima et al. | 429/218 |
| 5,672,446 | * 9/1997 | Barker et al. | 429/218 |

FOREIGN PATENT DOCUMENTS 0 627 777 A2    5/1994 (EP) .
PCT/US95/05776  10/1995 (WO) .

OTHER PUBLICATIONS

ISO R349 Dec. 1963.
Patent Abstracts of Japan Application No. 06114568 dated Apr. 28, 1994.

* cited by examiner

Primary Examiner—Carol Chaney
(74) Attorney, Agent, or Firm—Sonnenschein, Nath & Rosenthal

(57) ABSTRACT

A method for producing an active anode substance includes: a step for preparing, with mesophase carbon as a starting material, two carbon materials different in calcination temperature; a step for combining the two carbon materials at a specified ratio, turning the mixture into particles, and molding them into a shaped body; and a step for sintering the shaped body in an atmosphere of an inert gas or in a vacuum into a sintered anode body.

4 Claims, 3 Drawing Sheets

ANODE MATERIAL, METHOD FOR PRODUCING IT AND NONAQUEOUS ELECTROLYTE CELL EMPLOYING SUCH ANODE MATERIALS

BACKGROUND OF THE INVENTION

1. Field of the Invention

This invention relates to a nonaqueous electrolyte secondary cell, more particularly to an active anode substance of the nonaqueous electrolyte secondary cell and a production method thereof, and a nonaqueous electrolyte secondary cell incorporating the anode substance.

2. Description of the Prior Art

Recently with spread of portable appliances such as video cameras, demand for reusable secondary cells in place of conventional disposable cells is increasing. The majority of secondary cells now available in the market are nickel-cadmium cells involving alkali solutions. It has been difficult, however, to improve further the energy density of a conventional cell because its voltage is about 1.2V. It presents with another problem: its self discharge rate rises as high as 20% when left at room temperature for one month.

To meet these problems studies have been directed to a nonaqueous electrolyte secondary cell which incorporates a nonaqueous solvent as an electrolyte solution and a light metal like lithium as a material of the anode, thereby to raise the voltage up to 3V, to increase the energy density, and to reduce the self-discharge rate. With such a secondary cell, however, the metal lithium used as a material of the anode grows into dendritic processes under the influence of repeated charges/discharges, and the processes may come into contact with the cathode to form a shunt within the cell, which may cause the life of the cell to shorten. This problem hinders the cell from being put into practice.

To meet this problem, a nonaqueous electrolyte secondary cell which incorporates an alloy of lithium or the like with other metals as a material of the anode has been proposed. The same problem still holds for this cell: repeated charges/discharges turn the alloy into fine particles, which may lead to the shortened life of the cell.

To meet above problems, for example, as disclosed in Japanese Unexamined Patent Publication No. 62-90863, a nonaqueous electrolyte secondary cell has been proposed in which a carbon material like cokes is employed as an active anode substance. This secondary cell, being free from above problems, is excellent in endurance to cyclic activation. Further, as disclosed by the present authors in Japanese Unexamined Patent Publication No. 63-135099, when $Li_xMO_2$ (where M represents one or more transition metals and x is a number not less than 0.05 and not more than 1.10) is used as an active cathode substance, the resulting nonaqueous electrolyte secondary cell will have a long life and a high energy density.

The nonaqueous electrolyte secondary cell which incorporates a carbon material as an active anode substance is more excellent in endurance to cyclic activation and safety as compared with the secondary cell which incorporates a metal lithium as an active anode substance, but is inferior in energy density to the latter. To improve this defect measures have been taken to improve the filling density, but it still remains a technically unsolved problem.

One of the reasons why this type of cell is inferior in energy density may lie in the fact that it requires the addition of a binder for adherence of a powder acting as an active substance. Namely, when a carbon material is used, a material like pitch is sintered and ground, or the material, after being ground, is sintered anew to produce a powder to be ready for use. Then, to this powder are added a binder such as rubber and a dispersant to produce a slurry. The slurry is applied on an electricity collecting body or is molded into pellets, to produce an anode. Thus, the electrode is composed of three elements; a carbon material, a binder and an electricity collecting body. The binder typically is added by 3–20%. The content of the active substance (filling density) in the cell is restricted by that amount of the binder, which will impose a limit on the capacity of the cell.

SUMMARY OF THE INVENTION

This invention has been proposed as a remedy for these problems, and intends to provide an active anode substance allowing the resulting secondary cell to have a high capacity, requiring nevertheless only carbon materials conventionally used, and a production method thereof, and a nonaqueous electrolyte secondary cell having a high energy density and a long life.

This invention has been proposed to meet above problems, and depends on a method by which to produce an active anode substance which consists of preparing two carbon materials different in calcination temperature from mesophase carbon, combining the two carbon materials at a specified ratio, turning the mixture into particles, converting the particles into a mold, and sintering the mold in an atmosphere of an inert gas or in a vacuum. This invention solves above problems by employing the active anode substance as a material of the anode and making a nonaqueous electrolyte secondary cell which incorporates the anode.

Another nonaqueous electrolyte secondary cell this invention provides comprises an electrode-layered body having a laminated structure with three or more layers when layers around the cathode and anode being summed, and whose discharge capacity per unit reaction area is adjusted to 6–100 $mAh/cm^2$. The discharge here concerned occurs under the condition where the charged electricity is maintained at 0.1C or less.

Mesophase carbon is used as a starting material, two carbon materials different in calcination temperature are prepared therefrom, and the two carbon materials are submitted to a specified process to produce a sintered body which, when used as an active anode substance, enables the resulting secondary cell to have a high capacity.

Further, electrode layers around the cathode and anode to form an electrode-layered body are allowed to be three or more in number, and the thickness of electrodes and the number of layers are so adjusted as to allow the electrode-layered body to have a discharge capacity per unit reaction area of 6–100 $mAh/cm^2$. This adjustment will enable the resulting cell to have a high capacity.

If the discharge capacity per unit reaction area exceeds 100 $mAh/cm^2$, the number of layers will be too small, and the resulting cell will not show a satisfactory performance when used as a secondary cell shaped like a square or cylinder like conventional cells, although they can be used with profit for backup purposes.

On the contrary, if the discharge capacity per unit reaction area is under 6 mAh/cm$^2$, the number of layers will become too large, and the resulting cell will have a discharge capacity similar to that of conventional cells.

DETAILED DESCRIPTION OF THE PREFERRED EMBODIMENT

Figure 1:
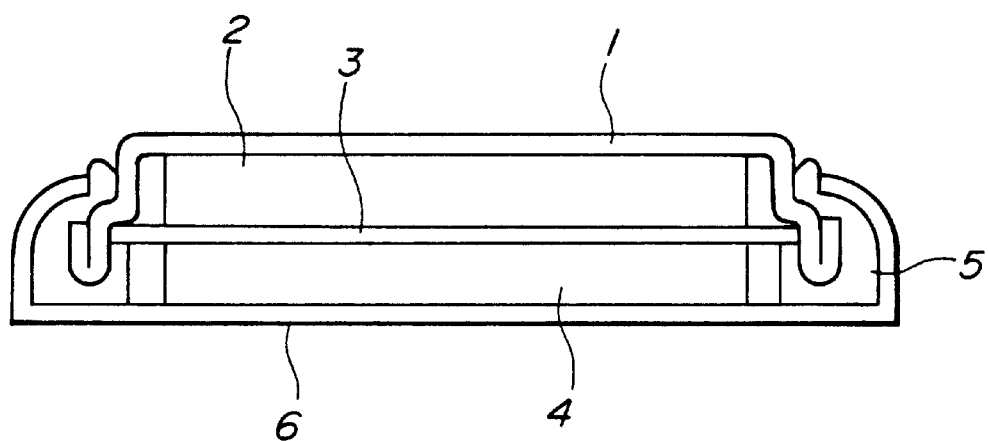
FIG. 1 shows a lateral sectional view of a nonaqueous electrolyte secondary cell of this invention.

This invention relates to a method by which to produce an active anode substance comprising a sintered body which consists of preparing two carbon materials different in calcination temperature from mesophase carbon, combining the two carbon materials at a specified ratio, turning the mixture into particles, and converting the particles into a mold, and sintering the mold in an atmosphere of an inert gas or in a vacuum, and to a nonaqueous electrolyte secondary cell which incorporates that active anode substance for the anode.

The carbon materials are sintered at a specified temperature, and, after sintering, ground to form a powder, from which carbon powder whose size is appropriate for use is selected and sintered anew to produce a sintered carbon body. The body is used as an active anode substance.

The source of the carbon material includes petroleum pitch, binder pitch, polymer resins, green cokes, etc., thermocracking carbons, cokes (coal cokes, pitch cokes, petroleum cokes, etc.), carbon black (acetylene black, etc.), glass-like carbon, sintered bodies from organic polymers, (the organic polymer is sintered in a current of an inert gas or in a vacuum at an appropriate temperature not less than 500° C.), pitches containing carbon fibers and resins, resins sensitive to sintering such as furan resins, and compounds which can be converted to mesophase carbon such as divinylbenzene, polyfluorinated vinylidene or polyvinylidene chloride.

In the nonaqueous electrolyte secondary cell of this invention, the materials other than those for the active anode substance include followings. Firstly, for the cathode is used an active substance containing Li$_x$Mo$_y$ where M represents one or more transition metals, preferably one from Co, Ni, and Fe, and x is a number not less than 0.05 and not more than 1.10. The appropriate active substance includes complex oxides (Li$_x$MO$_2$) represented by LiCoO$_2$, LiNiO$_2$, Li$_x$Ni$_y$Co$(1-y)$O$_2$ (where $0.05 \leqq \leqq 1.10$, and $0<y<1$). Further, LiMn$_2$O$_4$ can be used.

The complex oxide can be obtained after, for example, carbonates of lithium, cobalt, nickel and the like are combined according to the formula of the desired oxide, and the mixture is sintered in an atmosphere containing oxygen at a temperature ranging from 600–1000° C. The starting material is not be limited to carbonates, but may include hydroxides, oxides, etc.

The electrolyte solution may include any conventionally used solutions, as long as they are produced after electrolytes have been dissolved in organic solvents. Accordingly, the appropriate organic solvent includes, for example, esters such as propylene carbonate, ethylene carbonate, x-butyrolactone, etc., diethylether, tetrahydroxyfuran, substituted tetrahydrofuran, dioxoran, biran and its derivatives, ethers such as dimethoxyethane, diethoxyethane, etc., 3 substituted-2-oxazolidinones such as 3-methyl-2-oxazolidinone, etc., sulforan, methylsulforan, acetonitrile, propionitrile, etc. These can be used alone or in combination of two or more. The electrolyte includes lithium perchloriate, lithium borofluorinate, lithium phosphofluorinate, lithium chloroaluminate, lithium halide, lithium trifluoromethanesulfonate, etc.

Then description will be given of the structure of the electrodes of the nonaqueous electrolyte secondary cell of this invention.

The nonaqueous electrolyte secondary cell of this invention comprises an electrode-layered body placed in a cell container, in which the anode incorporating an active anode substance made from carbon materials and the cathode incorporating an active anode substance made from a lithium complex oxide have a laminated structure with three or more layers in total, and whose discharge capacity per unit reaction area is adjusted to 6–100 mAh/cm$^2$.

The discharge capacity per unit reaction area here concerned refers to a discharge capacity which is obtained from a charged electricity not less than 0.1C, and means a value obtained after the discharge capacity has been divided by the effective reaction area (anode reaction area).

With the nonaqueous electrolyte secondary cell of this invention, the thickness of electrodes and the number of layers are so adjusted as to allow the thus calculated discharge capacity per unit reaction area to fall between 6–100 mAh/cm$^2$.

For an electrode-layered body, as long as the same materials are used, the thicker the electrodes, and the smaller in number the layers, the larger the discharge capacity per unit reaction area. Conversely, the thinner the electrodes and the larger in number the layers, the smaller the discharge capacity per unit reaction area.

As seen from above, after the thickness of electrodes and the number of electrode layers have been adjusted to give a desired discharge capacity per unit reaction area, a cell with a high capacity will be obtained. Further, if the discharge capacity per unit reaction area is adjusted appropriately, the resulting cell not only has a high capacity under a light load but also maintains a good performance under a considerably big load encountered in practice such as operation lasting as long as five hours.

If the discharge capacity per unit reaction area exceeds 100 mAh/cm$^2$, the number of layers will be too small, and the resulting cell will not show a satisfactory performance when used as a secondary cell shaped like a square or cylinder like conventional cells, although they can be used with profit for backup purposes. On the contrary, if the discharge capacity per unit reaction area is under 6 mAh/cm$^2$, the number of layers will become too large, and the resulting cell will have a discharge capacity similar to that of conventional cells.

The discharge capacity per unit reaction area therefore preferably is set to 6–100 mAh/cm$^2$, or more preferably to 6–30 mAh/cm$^2$.

According to this invention, the discharge capacity per unit reaction area is adjusted in the above range. The control of the discharge capacity per unit reaction area is achieved after the thickness of active substances constituting the electrode-layered body, and the filling density of the active substances have been adjusted properly. The constitution of electrodes should be determined after a due consideration has been paid to those parameters.

The cathode and anode constituting an electrode-layered body include, for example, followings.

Firstly, the anode is produced after a compound slurry for the anode comprising a carbon material acting as an active substance, a binder and a dispersant has been applied onto an electricity collecting body, and the assembly dried and molded. This anode is of coated type.

Alternatively, the binder is added to the carbon material, the mixture is turned into particles, and the particles together with an electricity collecting body in the form of a mesh are molded to produce a anode of molded type. To turn the mixture into particles, spray-drying which consists of blowing a melt through a nozzle to atomize will be the best because the resulting particles are adapted for molding.

Furthermore, a complex sintered body which is obtained after a material which will become carbonic when sintered has been sintered together with an electricity collecting body in the form of a mesh may be used. This complex sintered body is particularly useful, because it does not contain a binder, and hence allows the electrode to have a higher filling density by the vacancy left by the binder.

The source of the carbon material includes petroleum pitch, binder pitch, mesophase pitch produced after polymer resins have been thermally treated, mesophase pitch part of which is oxidized, mesophase pitch part of which becomes carbonic, mesophase pitch all of which becomes carbonic, and compounds which are not completely carbonic but has a sensitivity to sintering such as green cokes.

It further includes graphite, thermocracking carbons, cokes (pitch cokes, petroleum cokes, etc.), carbon black (acetylene black, etc.), glass-like carbon, sintered bodies from organic polymers, (the organic polymer is sintered in a current of an inert gas or in a vacuum at an appropriate temperature not less than 500° C.), pitches containing carbon fibers and resins, and resins sensitive to sintering such as furan resins, divinylbenzene, polyfluorinated vinylidene, polyvinylidene chloride, etc. They may be used after they have been thermally treated and ground, and the size of the powder been adjusted appropriately.

To obtain an active anode substance from mesophase carbon it is desirable to resort to following steps: two carbon materials different in calcination temperature are prepared from mesophase carbon; the two carbon materials are combined at a specified ratio, turned into particles; and converted into a mold, and the mold is sintered in an atmosphere of an inert gas or in a vacuum. The cathode is produced after a compound slurry for the cathode comprising a lithium complex oxide acting as an active substance, a binder and a dispersant has been applied onto an electricity collecting body, and the assembly dried and molded. This cathode is of coated type. Alternatively, the binder is added to the lithium complex oxide, the mixture is turned into particles, and the particles together with an electricity collecting body in the form of a mesh are molded to produce a cathode of molded type. As a further modification, an active cathode substance is bonded by sintering to the electricity collecting body in the form of a mesh.

As a material of the lithium complex oxide which is used for the cathode, the compounds mentioned above in relation to the appropriate cells of this invention may be used.

With this cell, a nonaqueous electrolyte solution is poured into a cell can containing an electrode-layered body having three or more layers around the anode and anode. For this nonaqueous electrolyte solution any organic solvents and electrolytes mentioned above with respect to the appropriate cells of this invention may be used.

EXAMPLES

This invention will be described below with reference to preferred examples. In Examples 1–22 and Comparisons 1–3, the effect of active anode substances produced according to specified processes was studied.

Example 1

Firstly, cathode pellets were produced as follows.

A cathode substance was obtained as below: 0.5 mol of lithium carbonate and 1 mol of cobalt carbonate were combined, and the mixture was sintered in the air at 900° C. for five hours, to produce LiCoO$_2$. This LiCoO$_2$ was so ground as to give a powder whose average diameter was 10 μm. Then, 91 wt. % of this LiCoO$_2$, 6 wt. % of graphite as a conductor, and 3 wt. % of polyfluorinated vinylidene as a binder were combined, to which was added N-methylpyrrolidone as a dispersant, to produce a paste. This paste was dried and molded by pressure to produce cathode pellets each of which had a volume density of 3.5 g/cm$^2$ and a diameter of 15.5 mm.

Next, the anode was prepared as follows.

Firstly, 88.5% of fixed carbon which is a mesophase carbon powder of a low expansion which has an expansion of 0% (as determined with a dilatometer which has been used for the measurement of the thermal expansion of coal) and whose particle size was below a 250 mesh, was treated in an oxidizing atmosphere at 300° C. for one hour, to produce a powder whose average diameter was 20 μm. This was referred to as carbon powder A.

Then, 88.5% of fixed carbon which is a mesophase carbon powder of a low expansion, or having an expansion of 0% (as determined with a dilatometer which has been used for the measurement of the thermal expansion of coal) and whose particle size was below a 250 mesh, was treated in an oxidizing atmosphere at 300° C. for one hour, then transferred to an atmosphere of an inert gas and allowed to stay there at 900° C. for three hours, to produce a powder whose average diameter was 20 μm. This was referred to as carbon powder B.

Next, the carbon powders A and B were combined at a ratio of 5:95, to which was added polyvinylalcohol (molecular weight being 500) as a binder. To the mixture was added water as a solvent, and the mass was kneaded. Later, the mass was strained with meshs of 150 μm or more, and of 250 μm or less, to adjust the size of particles. From these particles were prepared pellets which had an average diameter of 16.7 mm. The pellets were treated in an inert gas at 1000° C. for three hours, to produce a sintered body to act as an active anode substance which had a diameter of 16.0 mm The constitution of a secondary cell which incorporates the above described active anode substance is given in FIG. 1. The secondary cell is constituted with an anode cup 1, an anode pellet 2 incorporating the active anode substance, a separator 3 made of polypropylene, the cathode pellet 4, a gasket 6 and a cathode can 6. The cathode pellet 4, gasket 5 and cathode can 6 are placed one over another in this order, an electrolyte solution is poured, and the elements were bonded together by pressure, to produce a lithium-ion coin-shaped cell which, being 20 mm in diameter and 2.5 mm in thickness, is the same in shape with the CR2025 type cell.

Comparative Example 1

A lithium-ion coin type cell was prepared in the same manner as in Example 1 except for the constitution of the anode pellet. The anode pellet was made as follows: pitch coke was ground so as to give a powder whose average diameter was 10 μm, 90 wt. % of the pitch coke powder and 10 wt. % of polyfluorinated vinylidene as a binder were combined, to which was added N-methylpyrrolidone as a dispersant, to produce a paste. The paste was dried and molded by pressure to produce a cathode pellet 2. The electrolyte solution was obtained after ethylene carbonate and diethyl carbonate were combined, to which was added a solution which had been produced after dissolution of $LiPF_6$ in diethyl carbonate to be 1 mol/l.

Examples 2–7

Lithium-ion coin type cells were prepared in the same manner as in Example 1 except that the carbon powders A and B were combined in different ratios.

Comparative Example 2

A lithium-ion coin type cell was prepared in the same manner as in Example 1 except that the anode pellet consisted only of the carbon powder B.

Comparative Example 3

A lithium-ion coin type cell was prepared in the same manner as in Example 1 except that the anode pellet consisted only of the carbon powder A.

The nonaqueous electrolyte secondary cells as prepared in Examples 1–7 and Comparisons 1–3 were charged by a constant current of 1 mA until they gave a final voltage of 4.2V, and then allowed to discharge through a discharge current of 3 mA until they gave a final voltage of 2.5V. During this sequence of charging and discharging, the discharge capacity was measured. The results are shown in Table 1. The same cells were subjected to a sequence of charging and discharging at 100 cycles/sec, and the ratio of the discharge capacity after 100 times charging/discharging against that after the first charging/discharging or the capacity retention after cyclic charging was calculated. The results are also shown in Table 1.

TABLE 1

| | Carbon powder A | Carbon powder B | Sintering intensity | One cycle charge capacity mAh | One cycle charge capacity mAh | Charge retention after cyclic charging (%) |
|---|---|---|---|---|---|---|
| comparative example 1 | none | none | — | 64 | 52 | 75 |
| comparative example 2 | 0 | 100 | impossible to sinter | impossible to assess | impossible to assess | impossible to assess |
| comparative example 3 | 100 | 0 | | 115 | 69 | 75 |
| example 1 | 5 | 95 | | 104 | 87 | 80 |
| example 2 | 10 | 90 | | 105 | 86 | 83 |
| example 3 | 30 | 70 | | 107 | 82 | 87 |
| example 4 | 50 | 50 | | 109 | 78 | 90 |
| example 5 | 70 | 30 | | 112 | 75 | 92 |
| example 6 | 90 | 10 | | 114 | 71 | 88 |
| example 7 | 95 | 5 | | 114 | 70 | 85 |

It is evident from these results that the cells in Examples are more excellent in charge/discharge capacity as compared with those in Comparisons. The ratio at which the carbon powders A and B are combined is preferably A:B= 5:95–95:5, more preferably 10:90–90:10. When the capacity retention after cyclic charging is considered, 30:70–90:10 is particularly preferred.

This is because a carbon powder component, if thermally treated at a temperature over 500° C., will not have a property to sinter by itself, while a carbon component, if thermally treated at a temperature under 500° C., will, though being able to sinter by itself, cause the charge/ discharge efficiency of the resulting cell to fall, because volatile elements will still exist during the final sintering. In these examples where a carbon powder which has been treated at a temperature under 500° C. is added as a binder to another carbon powder which has been treated at a temperature over 500° C., it becomes possible to obtain a lithium-ion cell which allows an excellent charge/discharge efficiency and cyclic charge activity.

Examples 8–17

The treatment temperature of carbon powder B, which was determined to be over 500° C., was fixed to 900° C. in Examples 1–7. The temperature was then allowed to vary from 500° C. to 1500° C., to produce Examples 8–17. The ratio at which the carbon powders A and B were combined was set to A:B=70:30 as in Example 5. The charge/discharge capacity, and capacity retention after cyclic charging of the cells were measured, and the results are shown in Table 2.

TABLE 2

| | Carbon Powder A Calcination temperature (° C.) | one cycle charge capacity (mAh) | one cycle charge capacity (mAh) | Charge retention after cyclic charging (%) |
| --- | --- | --- | --- | --- |
| example 8 | 500 | 164 | 66 | 75 |
| example 9 | 600 | 136 | 75 | 80 |
| example 10 | 700 | 122 | 76 | 85 |
| example 11 | 800 | 116 | 77 | 92 |
| example 5 | 900 | 112 | 75 | 92 |
| example 12 | 1000 | 109 | 73 | 92 |
| example 13 | 1100 | 105 | 70 | 90 |
| example 14 | 1200 | 103 | 70 | 88 |
| example 15 | 1300 | 102 | 68 | 87 |
| example 16 | 1400 | 98 | 66 | 85 |
| example 17 | 1500 | 95 | 64 | 80 |

It is evident from the inspection of Table 2 that the carbon powders which have been treated at a temperature higher than 600° C. and lower than 1200° C. will give a cell which is excellent in charge/discharge capacity and capacity retention after cyclic charging, and that to have a long life, a cell is preferably made from a carbon which has been treated at a temperature not less than 700° C. and not more than 1100° C.

Examples 18–22

The carbon powder A was prepared while thermally untreated, or after the treatment temperature was allowed to vary up to 500° C., to produce Example 18–22. The ratio at which the carbon powders A and B were combined was determined to be A:B=70:30 as in Example 5. The charge/discharge capacity, and capacity retention after cyclic charging of the cells were measured, and the results are shown in Table 3.

TABLE 3

| | Carbon Powder A Calcination temperature (° C.) | one cycle charge capacity (mAh) | one cycle charge capacity (mAh) | Charge retention after cyclic charging (%) |
| --- | --- | --- | --- | --- |
| example 18 | none | 116 | 77 | 75 |
| example 19 | 100 | 115 | 76 | 80 |
| example 20 | 200 | 112 | 76 | 85 |
| example 5 | 300 | 112 | 75 | 92 |
| example 21 | 400 | 110 | 73 | 87 |
| example 22 | 500 | 109 | 73 | 76 |

It is evident from the inspection of Table 3 that to obtain a cell with a good capacity retention after cyclic charging it is necessary to treat the carbon powder A at a temperature between 100° C. and 400° C., although the charge/discharge capacity was nearly the same for all the cells. This is probably because, if the carbon powder is treated at 500° C., its resin content will be reduced to an extremely low level, and its sintering temperature will fall in association. The cell from Example 18 wherein the carbon powder has never been thermally treated gives a good charge/discharge capacity, though being poor in the capacity, retention after cyclic charging. Thus, it is preferred, for the capacity retention to be maintained at a satisfactory level, to treat the powder at a temperature over 100° C.

It is needless to say that, although in above Examples mesophase carbon powders which had been strained with a 250 mesh were used, other mesophase carbon powders comprising more coarse or finer particles may be used as well.

In above Examples, coin type secondary cells were prepared to check the performance of the cells produced according to this invention, but the similar evaluation was obtained from the square-shaped secondary cells prepared according to this invention. Thus, this invention can also be applied with profit to layer built cells and card-type cells. Further, the sintered body prepared according to this invention can be ground to powder anew, to be applied for the production of a helical cell.

Figure 2:
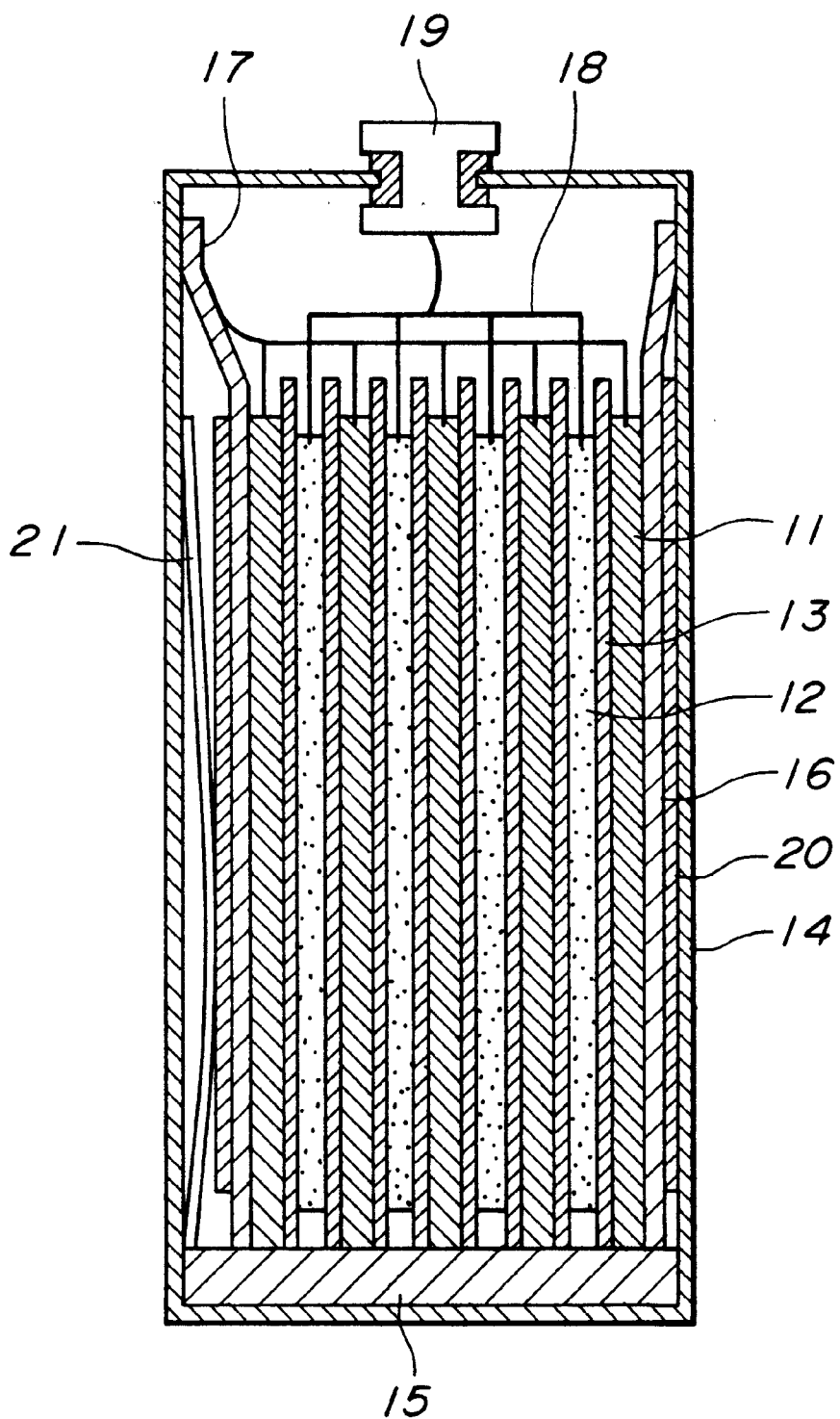
FIG. 2 shows a lateral sectional view of a square-shaped secondary cell which has been produced as an application of this invention.

In following Examples 23–33, and Comparisons 4 and 5, square-shaped secondary cells as shown in FIG. 2 were prepared, and the effect of the structure on the performance of the cell was studied. The number of layers around the anode and cathode differ according to the cells in Examples and Comparisons.

Example 23

As a first step, the anode was prepared as follows.

A mesophase carbon powder with a low expansion comprising 88.5% of fixed carbon, having an overall expansion of 0% (as determined with a dilatometer which has been used for the measurement of the thermal expansion of coal), and having been strained with a 250 mesh was sintered in an oxidizing atmosphere (in the air in this Example) at 300° C. for one hour, to produce a powder whose average diameter was 20μ. This was referred to as carbon material C.

A mesophase carbon powder with a low expansion comprising 88.5% of fixed carbon, having an overall expansion of 0% (as determined with a dilatometer which has been used for the measurement of the thermal expansion of coal), and having been strained with a 250 mesh was sintered in an oxidizing atmosphere (in the air in this Example) at 300° C.

for one hour and then in an atmosphere of an inert gas (nitrogen in this Example) at 900° C. for three hours, to produce a coke-like mass. This mass was ground to powder whose average diameter was 20. This was referred to as carbon material D.

Next, the carbon materials C and D were combined at a ratio of 70:30, to which was added polyvinyl alcohol (molecular weight) as a binder. Water was added as a solvent to the mass, and the mixture was kneaded. The resulting mass was strained with a mesh of 250 or less, and another mesh of 150 or more, to adjust the size of resulting particles.

A pressure was applied to those particles together with a copper mesh which is to act as an anode collecting body, to produce a square-shaped electrode assembly. This electrode assembly incorporating a copper mesh was sintered in an atmosphere of an inert gas at 1000° C. for three hours, to produce a anode 11 (complex sintered body). This active anode substance had a volume density of 1.25 g/ml and a true density of 1.75 g/ml. The anode had a thickness of 0.18 mm for the outermost two layers and of 0.36 mm for the remaining layers.

Next, a cathode 12 was prepared as follows.

A 91 wt. parts of $LiCoO_2$ as an active cathode substance, 3 wt. parts of ketchen black as a conductor, and 2.5 wt. parts of polyfluorinated vinylidene were combined, to which was added dimethylformamide as a dispersant, to produce a slurry. The slurry was dried, being blown by a hot air of 150° C. from a spray drier for organic solvents (Sakamoto Technological Institute), to produce powdery particles which have a complete spherical shape of a diameter of about 100μ. Those particles together with an aluminum mesh which is to act as an anodal electricity collecting body, was molded by pressure to produce a cathode 2. This active cathode substance had a volume density of 3.1 g/ml. The cathode 2 was allowed to have a thickness of 0.36 mm.

These anode and cathode preparations 11 and 12 were punched into strips of 41.5×32.3 mm, and 39.5×31.0 mm, respectively. These anode and cathode preparations 11 and 12 were layered one over another with a separator 13 which is of 30 μm and made of a porous polyethylene film placed between. Thus, eight strips of anode preparations 11 and seven strips of cathode preparations were layered to produce a cell consisting of 15 electrodes in total with 17 separators 3 inserted between them. Finally, a strip of adhesive tape 20 having a width of 40 mm was used to fix the outermost layers, to complete a layer built cell.

Next, an insulating plate 15 was applied to a nickel-plated square-shaped cell can 14, and they received the above-described laminated electrode assembly, together with a spring plate 16 and an electrode tightener 21. To remove the anode of collecting electricity, one end of an anode lead was bonded by pressure to the anode 11, and the other end was welded to the cell can 14. Further, to remove the cathode of collecting electricity, one end of an cathode lead made of aluminum was jointed with cathodes 12, and the other end was welded by laser to an cathode terminal 19. The cathode terminal 9 incorporates a safety device depending on valve operations by which to cut electric current according to the internal voltage.

Then, into this cell can 14 was poured an electrolyte solution which was produced after $LiPF_6$ had been dissolved to 1 mol/l in a mixture comprising 50 vol. % of propylene carbonate and 50 vol. % of diethyl carbonate. The cathode terminal 19 was welded by laser to the can, to produce a square-shaped cell of 8×48×34 mm in thickness, height and width.

Examples 24–28

Square-shaped cells were produced in the same manner as in Example 23 except that the thickness of electrodes and the number of layers were changed as shown in Table 4. These cells are referred to as Examples 24–28.

The thickness of electrodes and the number of layers of the cells wherein the anode incorporated the complex sintered body and the cathode the mold from particles are listed in Table 4.

TABLE 4

|  | Thickness of anode electrode (outermost) (mm) | Thickness of anode electrode (innermost) (mm) | Thickness of cathode (mm) | Number of anode layers (outermost) | Number of anode layers (innermost) | Number of cathode layers | Number of layers |
| --- | --- | --- | --- | --- | --- | --- | --- |
| example 23 | 0.18 | 0.36 | 0.36 | 2 | 6 | 7 | 15 |
| example 24 | 0.26 | 0.51 | 0.51 | 2 | 4 | 5 | 11 |
| example 25 | 0.32 | 0.63 | 0.63 | 2 | 3 | 4 | 9 |
| example 26 | 0.43 | 0.85 | 0.85 | 2 | 2 | 3 | 7 |
| example 27 | 0.63 | 1.28 | 1.28 | 2 | 1 | 2 | 5 |
| example 28 | 0.85 | 1.69 | 1.69 | 1 | 1 | 1 | 3 |
| example 4 | 0 | 0.17 | 0.18 | — | 15 | 14 | 29 |
| example 5 | — | 2.54 | 2.54 | — | 1 | 1 | 2 |

Example 29

Firstly, an anode 11 was prepared as follows.

As a starting material was used petroleum pitch, to which was introduced 10–20 wt. % of a functional group containing oxygen (oxygen cross-linking), and the mixture was sintered in a current of an inert gas at 1000° C., to produce a carbon material having a property like glassy carbon. This carbon material was submitted to X-ray diffraction analysis, and it was found that for the surface (002) adjacent surfaces have an interval of 3.76 angstrom. The same material was submitted to the measurement with a picnometer, and found to have a true density of 1.58 $g/cm^3$. This carbon material was ground to powder whose average diameter was 10.

The thus obtained carbon material was employed as an active anode substance, and 90 wt. parts thereof and 10 wt. parts of polyfluorinated vinylidene were combined to produce a anode preparation. This anode preparation was allowed to disperse in N-methylpyrrolidone acting as a solvent, to produce a slurry.

This anode preparation in the form of a slurry was applied on both sides of a strip of copper with a thickness of 0.01 mm. After being dried, the strip was pressed with a rolling press machine to produce a strip of anode electrode 11 (coated electrode). The anode 11 has a thickness of 0.18 mm for the outermost layers, and of 0.36 mm for the remaining common layers. The anode excluding the anode collecting body had a volume density of 1.0 g/m.

Next, a cathode 12 was prepared as follows.

Lithium carbonate and lithium cobalt were combined at a molecular ratio of Li:Co=1:1, and the mixture was sintered in the air for five hours. The resulting mass was submitted to X-ray diffraction analysis, and found to have a similar structure to that of $LiCoO_2$ in JCPDS card. Later, the mass was ground with an automated crucible, to produce a powder of $LiCoO_2$.

The thus obtained $LiCoO_2$ was employed as an active cathode substance, and 91 wt. parts thereof, 16 wt. parts of graphite as a conductor, and 3 wt. parts of polyfluorinated vinylidene as a binder were combined to produce a cathode preparation. This cathode preparation was allowed to disperse in N-methylpyrrolidone to produce a slurry.

This cathode preparation in the form of a slurry was applied on both sides of a strip of aluminum foil with a thickness of 0.02 mm. The cathode 12 was allowed to have a thickness of 0.36 mm. The volume density of the cell excluding the electricity collecting body was 3.1 g/ml.

As seen from above, a square-shaped secondary cell was prepared in the same manner as in Example 1 except that the active cathode layers had been prepared by a coating process.

Examples 30–33

Square-shaped secondary cells were prepared in the same manner as in Example 29 except that the thickness of electrode layers and the number of the layers were varied as shown in Table 5. These cells are referred to as Examples 30–33.

For Examples 29–33 in which the anode and anode were made from coated layers, the thickness of the electrodes and the number of electrodes are listed in Table 5.

Comparison 4

A square-shaped secondary cell was prepared in the same manner as in Example 23 except that the anode had a thickness of 0.17 mm, the cathode a thickness of 0.18 mm, and the layers totaled 29 in number (see Table 4).

Comparison 5

A square-shaped secondary cell was prepared in the same manner as in Example 23 except that the anode had a thickness of 2.54 mm, the cathode a thickness of 2.54 mm, and the layers totaled 2 in number.

Evaluation of Performance

The square-shaped secondary cells as described in Examples and Comparisons were charged by a constant current of 400 mA until they gave a final voltage of 4.2V, and then allowed to discharge by giving a discharge current of 200 mA (discharge at 0.05C) until they gave a final voltage of 2.5V. During this sequence of charging and discharging, the discharge capacity was measured. The results from square-shaped secondary cells incorporating sintered body electrodes such as those in Examples 23–28 and Comparisons 4–5 are shown in Table 6 and FIG. 3, while the results from the square-shaped secondary cells incorporating coated electrodes such as those in Examples 29–33 are shown in Table 7 and FIG. 4.

TABLE 6

|  | Discharge capacity (200 mAh) (mAh) | Discharge capacity (50 mAh) (mAh) | Reaction area ($cm^2$) | Discharge capacity per unit reaction area ($mAh/cm^2$) |
| --- | --- | --- | --- | --- |
| example 23 | 948 | 1138 | 171.4 | 6.64 |
| example 24 | 1043 | 1251 | 122.5 | 10.21 |
| example 25 | 1150 | 1380 | 98.0 | 14.08 |
| example 26 | 1185 | 1442 | 73.5 | 19.34 |
| example 27 | 1130 | 1450 | 48.8 | 29.71 |
| example 28 | 1035 | 1493 | 24.4 | 61.19 |
| comparrative example 4 | 790 | 1493 | 342.9 | 2.53 |
| comparrative example 5 | 805 | 1538 | 12.2 | 126.1 |

TABLE 5

|  | Thickness of anode electrode (outermost) (mm) | Thickness of anode electrode (innermost) (mm) | Thickness of cathode (mm) | Number of anode layers (outermost) | Number of anode layers (innermost) | Number of cathode layers | Number of layers |
| --- | --- | --- | --- | --- | --- | --- | --- |
| example 29 | 0.18 | 0.36 | 0.36 | 2 | 6 | 7 | 15 |
| example 30 | 0.26 | 0.51 | 0.51 | 2 | 4 | 5 | 11 |
| example 31 | 0.32 | 0.63 | 0.63 | 2 | 3 | 4 | 5 |
| example 32 | 0.43 | 0.85 | 0.85 | 2 | 2 | 3 | 7 |
| example 33 | 0.63 | 1.28 | 1.28 | 2 | 1 | 2 | 5 |

TABLE 7

|  | Discharge capacity (200 mAh) (mAh) | Discharge capacity (50 mAh) (mAh) | Reaction area (cm$^2$) | Discharge capacity per unit reaction area (mAh/cm$^2$) |
|---|---|---|---|---|
| example 29 | 930 | 1095 | 171.4 | 6.39 |
| example 30 | 1010 | 1153 | 122.5 | 9.41 |
| example 31 | 1070 | 1220 | 98.0 | 12.45 |
| example 32 | 1050 | 1290 | 73.5 | 17.55 |
| example 33 | 1000 | 1310 | 48.8 | 26.84 |

It is evident from these results that the square-shaped secondary cells from Examples 23–33 whose discharge capacity per unit reaction area of electrode is 6–100 mAh/cm$^2$ while the charged electricity is maintained at 0.1C or less, are superior in discharge capacity to those from Comparisons. As seen from this, it is possible to improve energy density by adjusting properly the discharge capacity per unit reaction area, that is, by adjusting properly the thickness of electrodes and the number of those electrode layers which are to be laminated. This type of cell has a high capacity not only when inflicted with a light load but also under a considerable load as encountered in practice such as operations lasting five hours. Particularly if the cell is allowed to have a discharge capacity of 6–30 mAh/cm$^2$, it will have a greatly improved discharge capacity.

Figure 3:
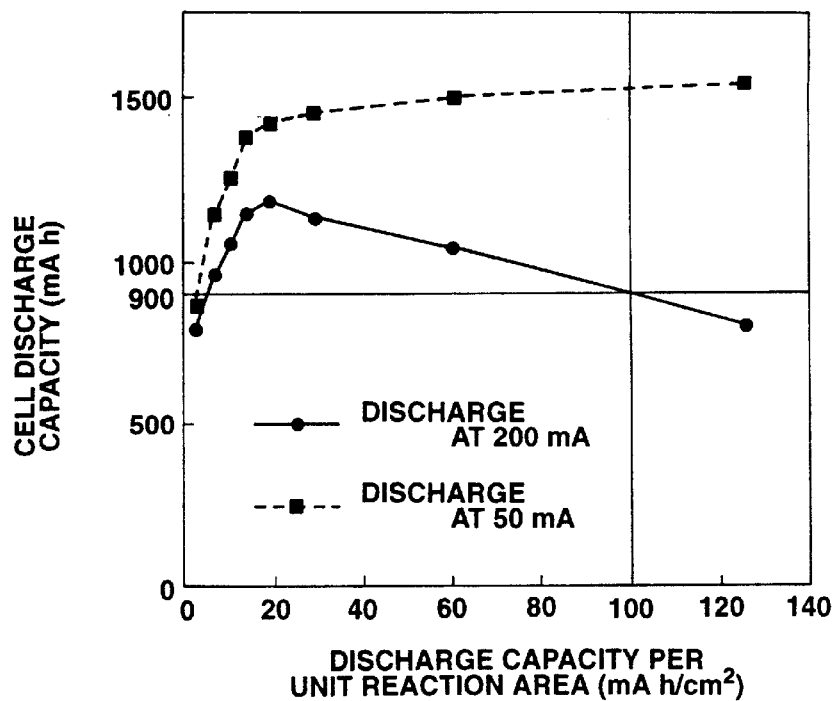
FIG. 3 shows a characteristic curve relating the discharge capacity per unit reaction area with the discharge capacity of a sintered body electrode of this invention.

As seen from the inspection of Table 6 and FIG. 3, it is evident that Examples 23–28 have a more improved load capacity than do Examples 29–33, because they suffer no decline in capacity even when the reaction area is reduced. This is because Examples 23–28 incorporate a complex sintered body as the active anode substance and a mold of particles as the active cathode substance in contrast with Examples 29–33 where coated electrodes are employed. In short, because the electrodes consisting of a sintered body and a mold does not require the addition of a binder, they have a high filling density, which will be beneficial for the capacity of the cell to be improved.

Figure 4:
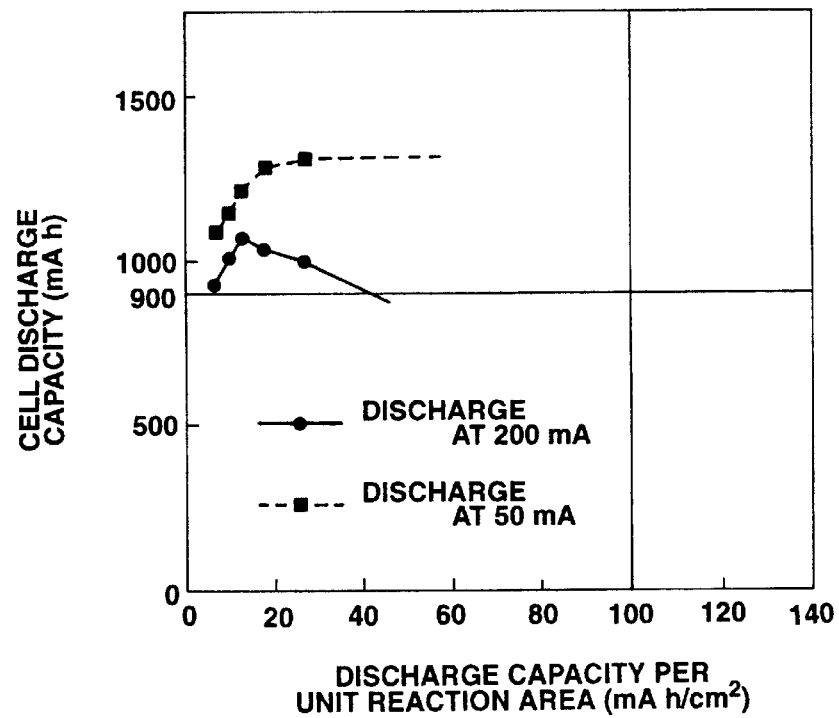
FIG. 4 shows a characteristic curve relating the discharge capacity per unit reaction area with the discharge capacity of a coated electrode of this invention.

As seen from the inspection of Table 7 and FIG. 4, Examples 29–32 incorporating coated electrodes are slightly inferior in performance to Examples 23–28 which incorporate sintered strip electrodes as discussed above. Nevertheless, they are improved in the discharge capacity because they have a thicker coat applied than does a conventional cell which has a very thin coat.

If a cell is prepared like the square-shaped secondary cell from Comparison 4 where the electrode is very thin, and the number of layers is large, or whose discharge capacity per unit reaction area is less than 6 mAh/cm$^2$, it has a similar discharge capacity to that of a conventional cell, and is scarcely effective. Conversely, if a cell is prepared like the square-shaped secondary cell from Comparison 5 whose discharge capacity per unit reaction area is more than 100 mAh/cm$^2$, it will have a smaller number of layers which will not bring about satisfactory results when the cell takes a square or cylindrical form.

As seen from above, this invention is particularly concerned with proper adjustment of the discharge capacity per unit reaction area. This allows the thickness and number of electrode layers to be set to a proper range, which in turn allows the manufacturer to design most conveniently a nonaqueous electrolyte secondary cell which will give a high capacity.

Examples used for the illustration of this invention involve square-shaped cells. But the same results can be obtained from layer built cells which comprise three or more electrode layers like cylinder-shaped cells.

As is evident from above description, according to this invention, two different kinds of carbon materials are obtained depending on different heat treatments from conventional materials. These materials are used to produce an active anode material which will be useful for the production of a high capacity secondary cell. Or, when the active anode material is used as a material of anode, the resulting non-aqueous electrolyte secondary cell will have a high energy density, an excellent cyclic performance and a long life. The nonaqueous electrolyte secondary cell of this invention, when its discharge capacity per unit reaction area is properly adjusted, gives a high capacity and hence helps the manufacturer design most conveniently a high capacity cell.

What is claimed is:

1. A method for making an anode comprising the steps of:
   preparing a first carbon powder by treating a mesophase carbon powder having an expansion of about 0% as measured with a dilatometer used for the measurement of a thermal expansion of coal by heating in an oxidizing atmosphere at a temperature of from about 100° to about 400° C. for a period of about one hour;
   preparing a second carbon powder by treating a mesophase carbon powder having an expansion of about 0% as measured with a dilatometer used for the measurement of a thermal expansion test for coal by heating in an oxidizing atmosphere at a temperature of from about 100° to about 400° C. for a period of about one hour and thereafter heating in an inert gas atmosphere at a temperature of from about 600° C. to about 1200° C. for a period of about three hours;
   admixing the first carbon powder and the second carbon powder together to form an admixture at a ratio of from about 5:95 to about 95:5, respectively;
   straining the admixture to provide a parcticle size adjusted powder admixture having first and second carbon powder particles within a selected particle size range;
   compressing the particle size adjusted powder admixture in the absence of any added binder onto a metal collector body to define an anode assembly; and
   thereafter, sintering the anode assembly by heating the anode assembly in an inert gas atmosphere at a temperature of about 1000° C. for a period of about three hours.

2. A method as defined in claim 1, wherein said metal collector body comprises copper, nickel, stainless steel, iron or mixtures thereof.

3. A method as defined in claim 1, wherein said metal collector body comprises a metal sheet having numerous pores, metal mesh, an expanded metal sheet, or a punched metal sheet.

4. A non-aqueous secondary cell comprising:
   an active anode material comprising a lithium composite oxide;
   an electrolyte comprising a lithium salt dissolved in a non-aqueous organic solvent; and
   a sintered composite anode comprising a metal collector body with a thermoplastic binder free electrically conductive sintered carbonaceous material disposed thereon, said sintered composite anode being obtained by a method for making an anode comprising the steps of:

preparing a first carbon powder by treating a mesophase carbon powder having an expansion of about 0% as measured with a dilatometer used for the measurement of a thermal expansion of coal by heating in an oxidizing atmosphere at a temperature of from about 100° to about 400° C. for a period of about one hour;

preparing a second carbon powder by treating a mesophase carbon powder having an expansion of about 0% as measured with a dilatometer used for the measurement of a thermal expansion test for coal by heating in an oxidizing atmosphere at a temperature of from about 100° to about 400° C. for a period of about one hour and thereafter heating in an inert gas atmosphere at a temperature of from about 600° C. to about 1200° C. for a period of about three hours;

admixing the first carbon powder and the second carbon powder together to form an admixture at a ratio of from about 5:95 to about 95:5, respectively;

straining the admixture to provide a particle size adjusted powder admixture having first and second carbon powder particles within a selected particle size range;

compressing the particle size adjusted powder admixture in the absence of any added binder onto a metal collector body to define an anode assembly; and thereafter, sintering the anode assembly by heating the anode assembly in an inert gas atmosphere at a temperature of about 1000° C. for a period of about three hours.

\* \* \* \* \*